O. LIEBKNECHT.
PROCESS OF PRODUCING PRUSSIC ACID.
APPLICATION FILED JAN. 27, 1917.

1,235,343.

Patented July 31, 1917.

Inventor
Otto Liebknecht
By his Attorney

UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS OF PRODUCING PRUSSIC ACID.

1,235,343.   Specification of Letters Patent.   Patented July 31, 1917.

Application filed January 27, 1917. Serial No. 145,020.

*To all whom it may concern:*

Be it known that I, OTTO LIEBKNECHT, a subject of the German Emperor, and resident of Frankfort-on-the-Main, Germany, have invented certain new and useful Improvements in Processes of Producing Prussic Acid, of which the following is a specification.

My present invention relates to the generation of prussic acid, its object being to provide improvements in a process of thermically generating prussic acid.

As to the influence of the application of pressure on chemical reactions we have only little knowledge and we are still far from being able to recognize any law in this relation. What is known in this respect is that some reactions may be promoted by the application of pressure while others can be checked thereby; and we further know that in singular cases, reduction of pressure has a favorable effect upon the reaction.

There have been presumptions made up to the present that the application of pressure to a gas mixture suitable for the synthesis of prussic acid while being subjected to heat, such for instance, as prevails in a high tension arc, will exert a beneficial effect on the reaction, but such presumptions or suggestions have not yet, as far as I am aware, been substantiated in a process warranting its industrial application.

Figure 1:
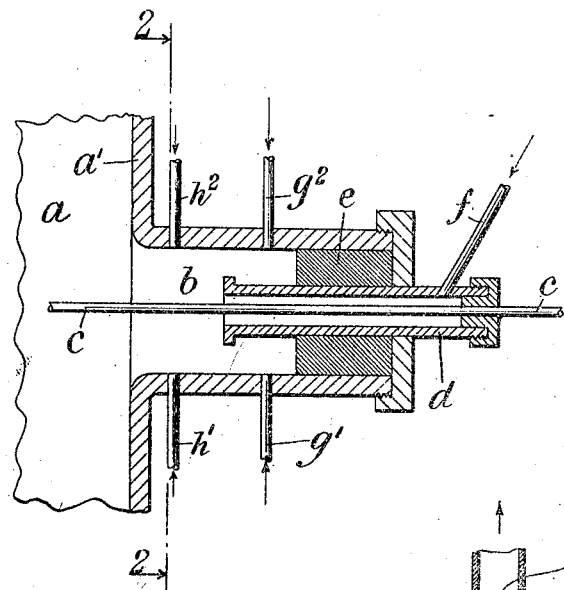
Figure 2:
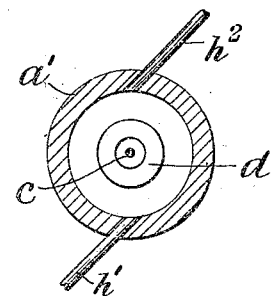
Figure 3:
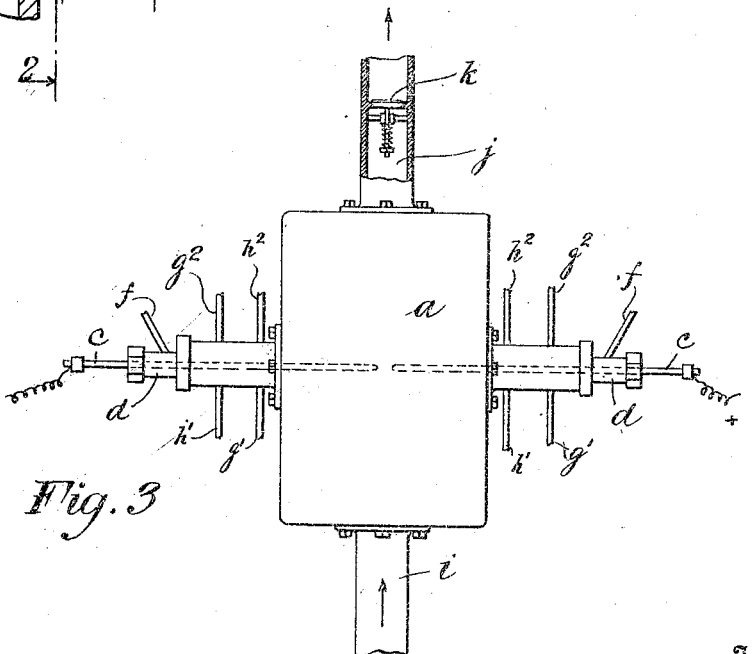

I shall describe, by way of example, how I carry out my new process and for the better understanding of my invention I refer to the accompanying drawing, which illustrates one type of apparatus suitable for the practice of my invention. In the drawing, Figure 1 is a vertical section through a portion of the reaction chamber; Fig. 2 is a sectional view of the apparatus shown in Fig. 1 along the line 2—2; and Fig. 3 is a side elevation of the complete apparatus, parts being shown in section.

Similar letters of reference indicate similar parts throughout the several views.

$a$ indicates the furnace chamber proper and $a'$ the furnace wall; $b$ indicates a side chamber connecting with the chamber $a$ and containing an electrode $c$ with its insulation tube $d$, $e$ indicates a gas tight packing; pipes $g^1$, $g^2$, $h^1$ and $h^2$ are provided to introduce the gases into chamber $b$; pipe $f$ serves as an inlet into insulating tube $d$. The pipes are preferably disposed so as to introduce the gases conducted by them tangentially to the walls of chamber $b$ or tube $d$, respectively, as shown in Fig. 2.

The details of the foregoing apparatus and the operation thereof have already been described and claimed in my copending application Serial No. 145,019, filed January 27, 1917.

In Fig. 3, I have shown the complete apparatus assembled. Connecting with furnace chamber $a$ at one end is a pipe $i$ for supplying the reacting gases. Pipe $j$ at the opposite end from pipe $i$ serves as an exit for the products of the reaction. $k$ indicates a spring controlled check valve which may be set to maintain any desired pressure in furnace chamber $a$.

As described in my copending application I pass through the pipes $f$, $g^1$ and $h^1$, and $g^2$ and $h^2$, gases either entirely free from carbon or which contain the latter only in such form that it will not be reduced from its compound under the conditions of the operation.

Such gases are for instance nitrogen, carbon monoxid or a mixture of these, either with or without hydrogen, in the form of producer gas; these gases introduced into the side-chamber $b$ serve, as already described in my copending application, to avoid what otherwise would take place, viz., the deposition of carbon on the electrodes owing to decomposition of the applied hydrocarbon by heat which would finally cause short-circuits. It is obvious that these gases finally mix with the reaction gases which I introduce into the reaction chamber proper under pressure through pipe $i$ or other suitable means, and when introduced into the side chambers, they are at least under the pressure prevailing in the reaction chamber.

I have found that the thermal treatment of the gases under pressure in chamber $a$, produces excellent results both with respect to the materials used and the energy applied. I have ascertained that a gas mixture which I obtained in approximately the manner described above, and comprising 5.3% of carbon monoxid, 8.3% methane, 33.7% of hydrogen and 42.7% of nitrogen yielded more than 50 gms. of HCN per kilowatt hour if treated at a pressure of 1.6 atmospheres, whereas a mixture of the same composition at atmospheric pressure yields only 40 gms. per kw. hour. It is obvious therefore, that the maintenance of a moderate pressure in the reaction chamber during the reaction is of great importance. The influence pressure is thus shown to have on the reaction is all the more interesting inasmuch as heat, together with pressure, is known to favor the deposition of soot, but such deposition is not present in my process, or is at least reduced to such a minimum that it cannot any longer be considered a source of danger or disturbance. The reason for this absence of soot during my process is not yet fully ascertained and various reasons may be cited for this fact, for instance that the gas mixture, is subjected to a greater degree to a kind of local heating by the electric arc and in the presence of gases incapable of partaking in the reaction, whereas in all the cases where a considerable degree of soot formation is obtained, pure hydrocarbons are subjected to heat from outside.

I claim:

The process of making hydrocyanic acid by subjecting a gaseous mixture of a hydrocarbon, hydrogen and nitrogen to the influence of heat from a high voltage arc, at a pressure of approximately 1.6 atmospheres.

In testimony whereof I have signed my name to this specification in the presence of two subscribing witnesses.

OTTO LIEBKNECHT.

Witnesses:
JEAN GRUND,
HARRY E. CARLSON.